May 5, 1925. 1,536,349
H. A. MIKKELSEN
SHAFT BEARING
Filed Jan. 19, 1922 2 Sheets-Sheet 2
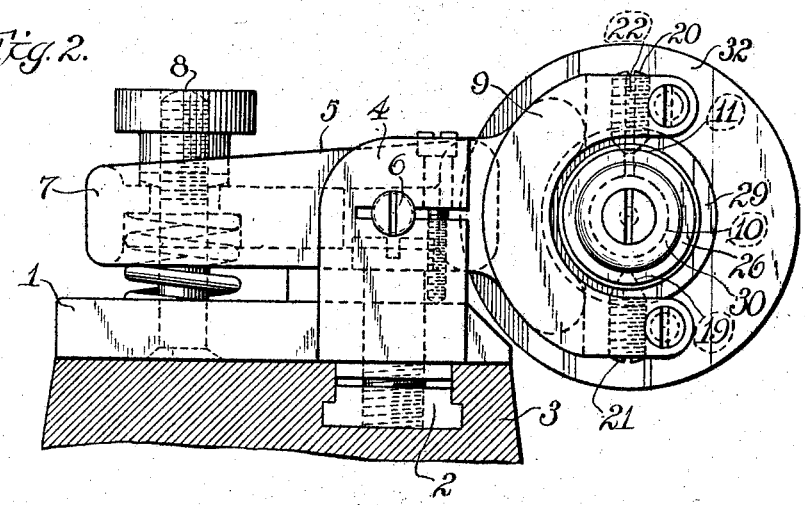
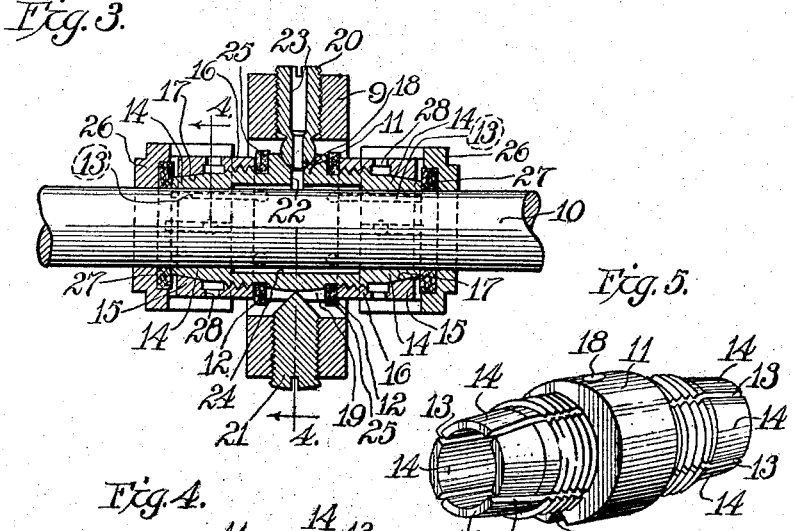
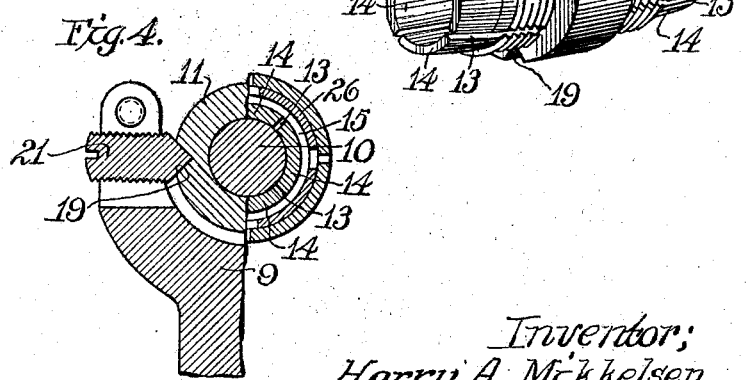
Inventor;
Harry A. Mikkelsen.
By Miehle & Miehle,
his Attys.

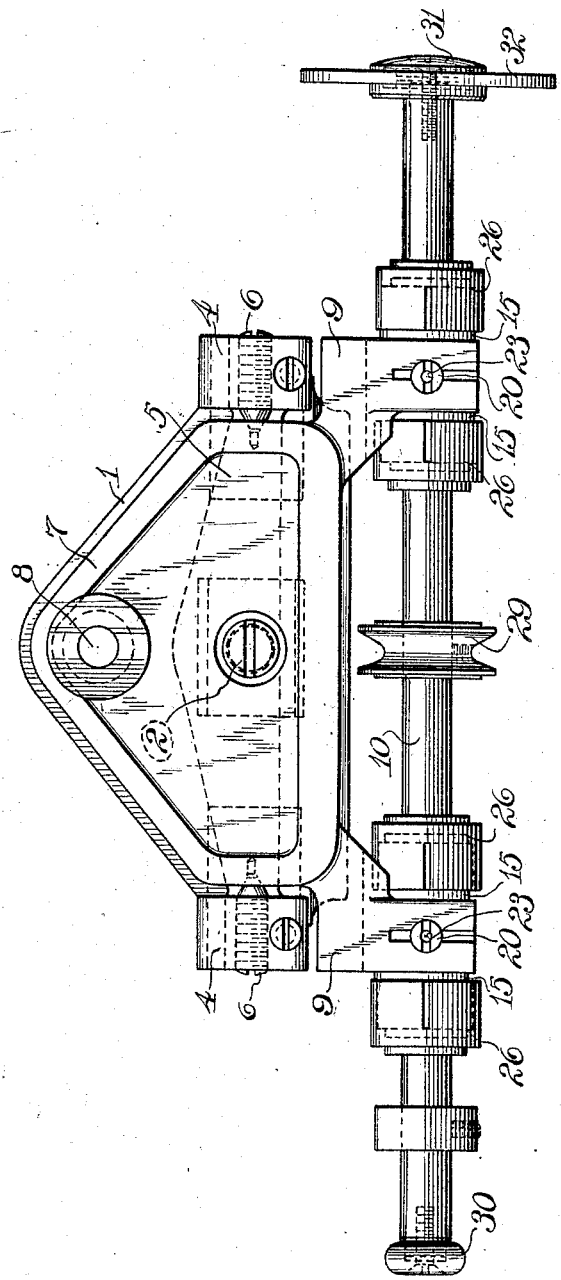

Patented May 5, 1925.

1,536,349

UNITED STATES PATENT OFFICE.

HARRY A. MIKKELSEN, OF CHICAGO, ILLINOIS, ASSIGNOR TO BELL & HOWELL COMPANY, OF CHICAGO, ILLINOIS, A CORPORATION OF ILLINOIS.

SHAFT BEARING.

Application filed January 19, 1922. Serial No. 530,352.

*To all whom it may concern:*

Be it known that I, HARRY A. MIKKELSEN, a citizen of the United States, residing at Chicago, in the county of Cook and State of Illinois, have invented a certain new and useful Improvement in Shaft Bearings, of which the following is a full, clear, concise, and exact description, reference being had to the accompanying drawings, forming a part of this specification.

My invention has particular relation to shaft bearings for grinder attachments although not limited to this use alone.

One of the features of my invention relates to a shaft or spindle bearing which is easily adjustable and which when properly adjusted eliminates lateral vibration of the shaft and effects a practically true rotation thereof.

The above feature and certain other features hereinafter appearing are embodied in the preferred form of my invention hereinafter fully described and illustrated in the accompanying drawings, and are effected by certain novel constructions, combinations and arrangements of parts particularly pointed out in the claims.

In the said drawings—

Figure 1 is a top plan view of a grinding attachment provided with shaft bearings of my invention.

Figure 2 is an end elevation of the same.

Figure 3 is a central vertical section of one of the bearings.

Figure 4 is a section on the line 4—4 of Fig. 3.

Figure 5 is a perspective view of one of the bearing members.

Like characters of reference indicate like parts in the various views.

In the drawings 1 designates a base member which is provided with a T-slot engaging device 2 for securing the base to a T-slotted member 3 of a machine to which the fixture is designed to be attached. See Figs. 1 and 2. The base member 1 is flat and has a pair of spaced upwardly extending arms 4. A support member 5 is pivotally supported from the base member by means of trunnion studs 6 adjustably secured in respective arms 4 and engaging respective recesses formed at opposite ends of the support member. The support member 5 has a portion 7 extending over the base on one side of the pivotal axis of the support member, and an adjusting device 8 connects this portion of the support member with the base for controlling the pivotal movement of the support member whereby the support member may be adjusted on its pivotal axis.

A pair of spaced extensions 9 are formed on the support member 5 and extend outwardly beyond the base member 1 in a direction from the pivotal axis of the support member opposite that from which the extending portion 7 thereof extends. This pair of extensions is spaced longitudinally of the pivotal axis of the support member and the outer ends thereof are bifurcated with the arms thereof spaced transversely of the plane of the extensions. A rotatable spindle shaft 10 is supported from said extensions and extends in parallelism with the pivotal axis of the support member, and is mounted in a pair of spaced bearings supported between the bifurcated arms of respective extensions 9. These bearings are identical and for this reason I will describe but one of them, the same reference characters designating similar parts thereof in the drawings.

A bored bearing member 11 of suitable metal such as hardened steel has an intermediate solid bore portion and externally reduced end bore portions adjoining the same, and has external concentric grooves 12 formed at the inner ends of the reduced end portions, thus reducing the section of the bearing member at the inner ends of the reduced end portions. See Figs. 3, 4, and 5. A plurality of longitudinally extending radial slots 13, spaced, preferably equally, about the bearing axis are formed in the end portions of the bearing member, and these slots terminate at respective grooves 12 and form sets of bearing segments 14 of the end portions of the bearing member. A pair of bored members 15 surround respective reduced end portions of the bearing member, and have screw threaded engagements 16 with the bearing member at the inner portions of respective reduced end portions adjacent respective grooves 12, and have axially extending outwardly reducing taper surface engagements 17 with respective sets of segments adjacent the outer ends thereof. The members 15 are thus adjustable longitudinally of the bearing member, and the taper surface engagement function to radially adjust the segments with longitudinal adjustment of the members 15, and to maintain radially the segments in the various adjusted positions of the members 15 the segments being solidly held in proper angular relation without interfering with the radial adjustment of the segments by reason of their connection with the solid bore portion of the bearing member.

The bearing member 11 has a circular recess 18 and a groove 19 formed at diametrically opposite points on the external surface of the large intermediate portion thereof, and these are respectively engaged by trunnion studs 20 and 21 adjustably mounted in respective arms of the respective bifurcated extension 9. The trunnion stud 20 has a universal pivot engagement with the recess 18 and the groove 19 extends longitudinally of the bearing axis and is formed on an arc having its axis substantially coincident with the axis of said universal pivot engagement of the stud 20 with the recess 18 thereby permitting universal movement of the bearing member for automatic alinement thereof. The stud 20 and recess 18 are disposed at the top of the bearing. A radial hole 22 is formed in the bearing member communicating with the recess 18 and the bore of the bearing member, and the stud 20 extends through the respective arm of the bifurcated extension 9 and has a longitudinally extending hole 23 communicating with said hole 22 of the bearing member in the recess, whereby a convenient means is provided for lubricating the bearing. See Fig. 3. The mid portion of the bore of the bearing member is preferably enlarged, as designated at 24.

Compressible packing washers 25 of felt or similar material are engaged in respective grooves 12 and between the opposing end surfaces of the bored members 15 and the intermediate solid bore portion of the bearing member 11 to exclude dust and other foreign matter from the inner ends of the radial slots 13, and concentrically bored cups 26 have the skirts thereof split and telescoped over the outer ends of respective members 15 and retain packing washers 27 of felt or similar material, seated in respective cups and surrounding the shaft 10, against the ends of the bearing to exclude dust and other foreign matter at the ends of the bearing. The members 15 are provided with spanner wrench holes 28 to facilitate the turning thereof, and the tension of the segments 14 against the members 15 retains them in adjusted position.

A driving pulley 29 is secured on the shaft 10 between the bearings. One end of the shaft 10 has a hand knob 30 mounted thereon for effecting longitudinal movement of the shaft, and the other end of the shaft is provided with a wheel clamping device 31 of usual construction for securing a grinding wheel 32 to the shaft.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A shaft bearing including a bored bearing member having a solid bore portion and an adjoining end bore portion provided with a plurality of longitudinally extending radial slots spaced about the bearing axis and forming a plurality of bearing segments, and a second bored member surrounding said end portion and having a screwthreaded engagement therewith at the inner portion thereof and an axially extending outwardly reducing taper surface engagement therewith at the outer portion thereof for radially adjusting and maintaining the segments.

2. A shaft bearing including a bored bearing member having a solid bore portion and an adjoining end portion provided with a plurality of longitudinally extending radial slots spaced about the bearing axis and forming a plurality of bearing segments, said bearing member having a concentric groove at the inner ends of said slots forming a reduced section, and a second bored member surrounding said end portion and having a screwthreaded engagement therewith at the inner portion thereof and an axially extending outwardly reducing taper surface engagement therewith at the outer portion thereof for radially adjusting and maintaining the segments.

3. A shaft bearing including a bored bearing member having a solid bore portion and an adjoining externally reduced end bore portion provided with a plurality of longitudinally extending radial slots spaced about the bearing axis and forming a plurality of bearing segments, said bearing member having an external concentric groove at the inner end of said slots forming a reduced section, a second bored member surrounding said end portion and having a screwthreaded engagement at the inner portion thereof and an axially extending outwardly reducing taper surface engagement therewith at the outer portion thereof for radially adjusting and maintaining the segments, a compressible packing washer engaged in said groove and between the opposing end surfaces of said solid bore portion and the second bored member, a concentrically bored cup telescoped over the outer end of said second bored member, and a packing washer seated in said cup.

4. A shaft including a bored bearing member having a solid intermediate bore portion and externally reduced end bore portions adjoining the same and provided with longitudinally extending radial slots spaced about the bearing axis and forming a plurality of bearing segments of each end portion, said bearing member being provided with external concentric grooves at the inner ends of said end portions forming reduced sections, and two bored members surrounding respective end portions and having screwthreaded engagements therewith at the inner portions thereof and having axially extending outwardly reducing taper surface engagements therewith at the outer portions thereof for radially adjusting and maintaining the segments.

5. A shaft including a bored bearing member having a solid intermediate bore portion and externally reduced end bore portions adjoining the same and provided with longitudinally extending radial slots spaced about the bearing axis and forming a plurality of bearing segments of each end portion, said bearing member being provided with external concentric grooves at the inner ends of said end portions forming reduced sections, two bored members surrounding respective end portions and having screwthreaded engagements therewith at the inner portions thereof and having axially extending outwardly reducing taper surface engagements therewith at the outer portions thereof for radially adjusting and maintaining the segments, compressible packing washers engaged in respective grooves and between respective opposing end surfaces of said solid bore portion and the two bored members, concentrically bored cups telescoped over the outer ends of respective said two bored members, and packing washers seated in respective cups.

In witness whereof I hereunto affix my signature this 17th day of January, 1922, A. D.

HARRY A. MIKKELSEN.